United States Patent [19]

Rose et al.

[11] 4,128,372
[45] Dec. 5, 1978

[54] EXTRUSION SHAPING APPARATUS

[75] Inventors: Larry E. Rose; Norman F. Lawrence, both of Battle Creek, Mich.

[73] Assignee: General Foods Corporation, White Plains, N.Y.

[21] Appl. No.: 816,106

[22] Filed: Jul. 15, 1977

Related U.S. Application Data

[60] Division of Ser. No. 591,575, Jun. 30, 1975, Pat. No. 4,051,162, and a continuation-in-part of Ser. No. 429,305, Dec. 28, 1973, abandoned.

[51] Int. Cl.² .............................................. A21C 3/04
[52] U.S. Cl. .................................... 425/311; 425/463
[58] Field of Search ............... 425/463, 311, 466, 462, 425/465, 461, 310; 426/516, 446, 448, 463

[56] References Cited

U.S. PATENT DOCUMENTS

| | | | |
|---|---|---|---|
| 2,853,027 | 9/1958 | Graves | 425/463 |
| 3,077,406 | 2/1963 | Benson | 426/446 |
| 3,476,567 | 11/1969 | Wood, Jr. et al. | 426/448 |
| 3,551,165 | 12/1970 | Reesman et al. | 426/448 |
| 3,861,844 | 1/1975 | Miller | 425/311 |
| 3,870,805 | 3/1975 | Hayes et al. | 426/516 |

*Primary Examiner*—Francis S. Husar
*Assistant Examiner*—William R. Briggs
*Attorney, Agent, or Firm*—Thaddius J. Carvis; Daniel J. Donovan; Bruno P. Struzzi

[57] ABSTRACT

An assortment of extrusion-puffed dough shapes of varying configurations is produced from a single extruding die assembly by mounting said assembly on a cooker extruder expander adapted to produce a gelatinized cereal dough mass and discharge same as individual moieties sequentially through a plurality of orifices in a backup zone and an extruding zone, the flow rates of said moieties being varied in passage in relationship to the flow characteristics of respective shaping dies by coordinating flow characteristics in respective backup zones so as to cause individual dough masses upon issuance from the face of the assorted extruding die orifices to have extrudates move at comparable linear speed whereby said moieties can be consecutively subdivided by a rotating knife assembly and uniformly puffed, flow coordination being evenly modulated by a substantial buffering zone in a dead space in said cooker.

5 Claims, 4 Drawing Figures

EXTRUSION SHAPING APPARATUS

RELATED APPLICATION

This application is a division of our application Ser. No. 591,575, filed June 30, 1975 now U.S. Pat. No. 4,051,162 for *DIE ASSEMBLY AND METHOD OF EXTRUDING CEREAL DOUGH MASSES* and a continuation-in-part of our application Ser. No. 429,305 filed Dec. 28, 1973 for *DIE ASSEMBLY AND METHOD OF EXTRUDING CERAL DOUGH MASSES.*

BACKGROUND OF THE INVENTION

The art of manufacturing a puffed dough-shape, particularly one which is sold in an assortment of characters such as alphabets, numerals or related but dissimilar shaped pieces such as animal forms for novelty purposes has relied upon the art of gun-puffing a partially cooked dough piece, viz. U.S. Pat. Nos. 2,954,295 and 2,954,296, issued Sept. 27, 1960, both entitled Process for Preparing Puffed Ceral Product, to Clausi et al. The limitations of gun puffing are such, however, that uniformity of the puffed dough pieces leaves much to be desired and yield of faithfully shaped expanded particles is less than would be preferred for optimal utilization of raw materials. Furthermore, from the standpoints of safety, sanitation and simplicity of equipment, it would be preferable if means other than a gun-puffer were employed for manufacturing novel shaped expanded dough masses.

One avenue for making a shaped dough piece which has been used commercially is a cooker extruder expander wherein a moist ceral dough is subjected to controlled heat and mechanical work to convert the starch content thereof into a partially gelatinized condition, at least, and cause the dough to pass an extruding die whereby the dough moves from a confined zone of high pressure to an unconfined zone of much lower, say, atmospheric pressure and the individual dough extrudate when it is simultaneously so-exposed undergoes rapid expansion.

Whereas such cooker expanders have enjoyed utility in manufacturing such products for sale as dry, ready-to-eat breakfast cereal products and snacks, they are limited in their versatility. It is sometimes preferable in marketing such products that they be in assorted shapes and that they not only be uniformly expanded but also that they be of a consistent size relative to one another. Providing such an assortment calls for employing a die assembly having a plurality of different shapes be they alphabetical, numerical or the like. Unfortunately, by reason of varying flow characteristics of the dough mass passing through differing shaping die orifices, there is a multiplicity of hydraulic flow patterns which must be reconciled if each of the cooked dough masses are to pass their respective extruding die in a uniform manner that results in a substantially comparable linear velocity for each moiety of cereal dough. The problem becomes manifest when, with varying flows, a rotating cutting knife will subdivide varying depths from the extrudate and result in eccentricities of product form as well as a loss of intended shape definition.

Accordingly, it is among the objects of the present invention to provide a cooker extruder expander die assembly and method of expanding an assortment of individual dough moieties whereby, despite their varying character as shaped, they are caused to issue from a confined zone of high pressure to a less confined zone of lower pressure and become expanded uniformly, said issuance being caused by the dough masses moving at a substantially comparable linear velocity with respect to the longitudinal axis of the extruder.

STATEMENT OF THE INVENTION

In accordance with the present invention, the assembly comprises forming a die plate coaxial with a backup plate, the die plate being provided with individual shape-defining dies, the backup zone or plate having a like coaxial plurality of flow-adjusting chambers defined therein either by individually mounted inserts or equivalent structures of varying flow patterns to be hereinafter described, the relative flow of gelatinized cereal dough moieties entering said flow adjusting chambers being such in relationship to the velocity of dough masses issuing from respective extruding dies that the individual moieties are coordinated in their linear velocities issuing from the die plate. In practicing this invention, the backup plate may have a series of chamber plugs of varying orifices sizes and configuration or alternatively the backup plate may, per se, have the aforesaid orifices intergrally formed therein. Likewise, the extruding die plate will have orifices therein which may have appropriate flow control means in the form of pins or restrictions intended to provide shape definition and also regulate the flow pattern of dough passing said dies.

The invention also involves a method whereby respective flow characteristics through a plurality of differing orifices in a backup zone are correlated with corresponding shaping die orifices at the expansion sites by inversely varying backup orifice size to shaping orifice open area. In this connection, a buffering zone is created intermediate the backup zone and the terminal of the cooker extruder dough-working zone whereby surging and flow variations charging the backup zone are modulated.

In its most preferred form the die assembly will be a three-member structure consisting essentially of an extruding die plate and a backup plate, as aforesaid, and a spacer ring having a uniform opening which modulates flow. It is also within the spirit of the invention that such members may be integrated into die shaping and flow regulating members, all of which will be apparent from the accompanying description of the preferred and best mode of practicing this invention which will now be described by reference to the accompanying drawings of the die assembly wherein.

Figure 1:
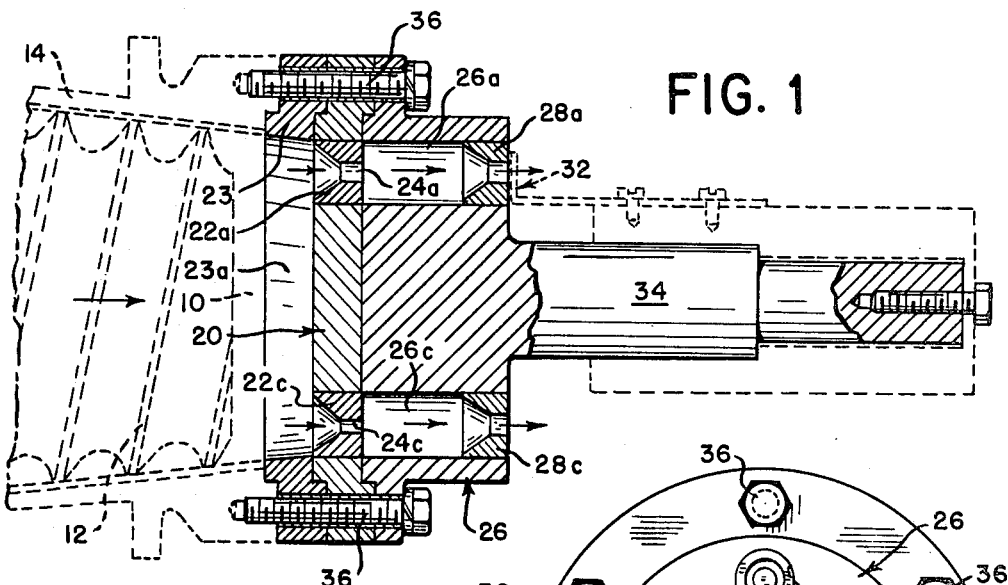
FIG. 1 is a side elevation partly in section and showing portions of the assembly mounted on an extruding expanding cooker shown in phantom view.
Figure 2:
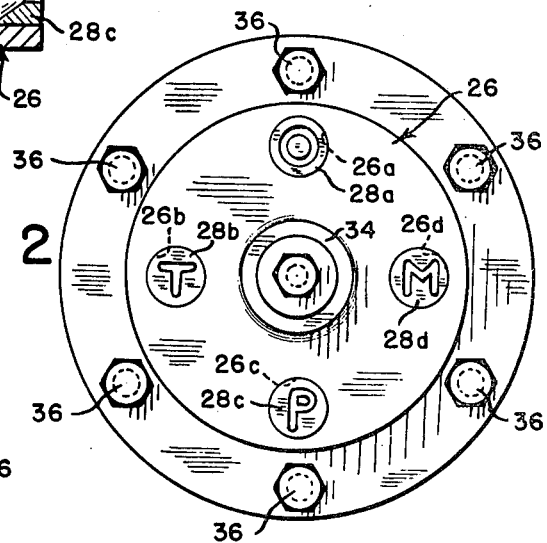
FIG. 2 is an end view of the extruding die plate with parts broken away to show the details of the varying die orifices for creating the intended assortment of shapes.
Figure 3:
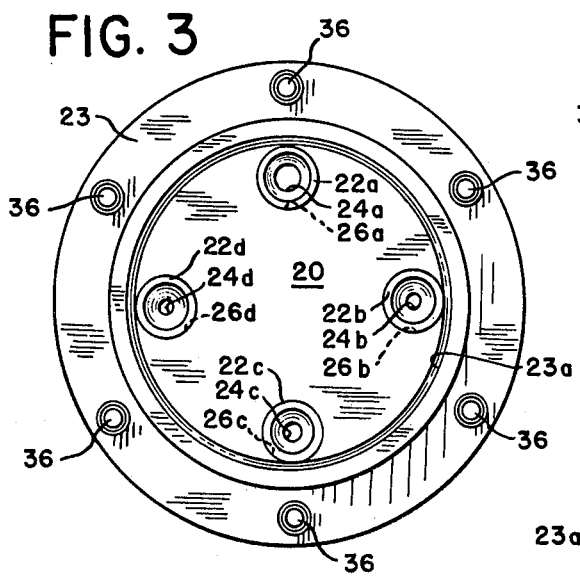
FIG. 3 is an opposite end view relative to that shown in FIG. 2 with parts similarly broken away to show varying flow chambers underlying a spacer ring.
Figure 4:
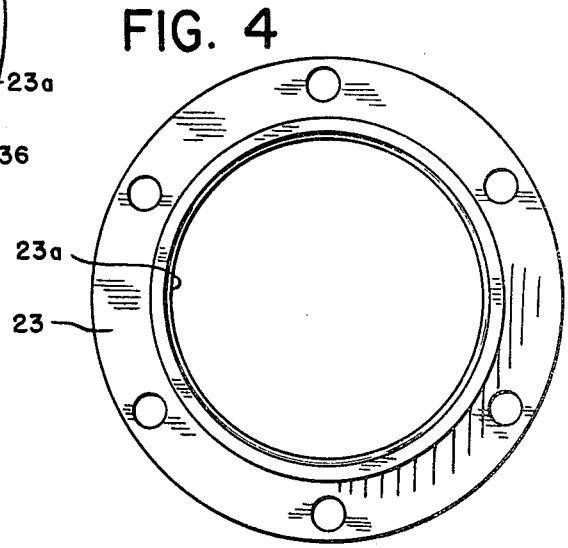
FIG. 4 is an end view of a cylindrical spacer ring.

In the process of extrusion there is a tendency of gelatinized cereal dough masses to spiral and surge upon passage under pressure from the end of the screw within the cooker due to erratic feeds, machine wear and slippage of dough. The use of spacer plates for compensation of this tendency is prior art, but so far as presently known has not been applied to modulate upstream variations in cross-sectional feed to a variety of backup zone orifices or assorted extrusion areas of differing flow characteristics. Such spacer means in this application, therefore, serves a distinctly different function. In relation to the flow control means in the backup plate there is an evening of the subdivision of the dough moieties fed thereto with a consequent consistency in flow regulation to the backup plate from the dough-working zone and transmission to and through the die plate, despite variations in intermediate flow from the areas between the screw and the cooking chamber. Thus, the spacer ring opening serve to provide surge compensation and hydraulic pressure equalization. The backup plate with varying flow generation direction and regulating means, depending upon die shaping requirements, controls flow more consistently and thereby enables a more uniform velocity of expanded extrudates introduced to the cutting knife.

Referring now to the accompanying drawings, the extruder expander may be any common apparatus known to skilled art workers such as those shown in U.S. Pat. No. 3,117,006 issued Jan. 7, 1964 to J. Wenger which are adapted to pre-condition a cereal mixture by heat and water causing the mass to be mechanically worked and heated between a series of screws coextensive within a tube and adapted to ultimately deliver a substantially gelatinized and cooked cereal dough to a chamber of high pressure phantomly shown as 10. This chamber is defined by a cone screw phantomly shown as 12, rotating within a cone head phantomly shown as 14 and forming no part of the present invention but necessary to deliver the mass of cereal dough to the assembly.

The extrusion die assembly consists of a cylindrical die plate 26 having die inserts or plugs 28 a, b, c, and d mounted therein, the plate having cylindrical passages 26 a, b, c, and d therein communicating with corresponding flow directing and regulating passages or backup orifices 24 a, b, c, and d in inserts in a cylindrical backup plate generally shown as 20, the backup plate similarly having its communicating flow regulating inserts 22 a, b, c, and d adapted to receive dough moieties and deliver same in varying flows to respective passages 26 and die inserts 28. Each of the flow regulating inserts 22 will be tapped so as to have a frustoconical point of entry thereto and/or issuance therefrom, respectively, and thereby alter the respective velocities of the moieties of cereal dough masses created as the dough is caused to pass under high pressure to the die area cylinders 26 a, b, c, d and eventually issue through die members 28 a, b, c and d. It will be practical to have varying patterns in passage orifices 24 a, b, c and d on either or both extremities of the respective flow regulating inserts 22 depending upon how it becomes necessary to coordinate flow velocity with the drag or other flow characteristics that are predetermined as necessary for a particular shaping die orifice 28 a, b, c, or d respectively. Cylindrical spacer ring 23 will have a uniform cylindrical opening 23a communicating with respective passages 24 in inserts 22 through abutment of ring 23 with backup plate 20.

As will be appreciated by men skilled in this art, the die plugs 28 may be provided with alphabets, numerals, animal figures, and like shapes intended to meet marketing requirements. A knife member phantomly shown as 32 is adapted to rotate about hub 34 which is an integral part of the die plate 26 and intersect at high speeds the individual dough moieties issuing from the die members per se, the rotational velocity of the cutting knife being so regulated in relation to the linear extrusion velocity of the individual dough moieties that a uniform depth of cut therefor is provided, the respective velocities of all of the aforesaid means being experimentally derived.

Selection of the proper size backup orifice is employed to regulate velocity through a given die insert. For example, the letter "M" in plug 28 d has more open area than the letter "T" in the plug 26 b, as indicated in the following illustrative tabulation.

| Letter Die | Open Slide Insert Area | Backup Orifice Size (diameter) |
| --- | --- | --- |
| "T" | .0240 in² | 3/8" |
| "O" | .0305 in² | 5/16" |
| "M" | .0425 in² | 1/4" |
| "P" | .0255 in² | 9/32" |

A smaller backup orifice 24 is used for the "M" than the flow velocity therethrough, quantity of flow equalling cross sectional area multiplied by velocity. When the dough reaches the "M" die 28, the larger open area of the "M" reduces the velocity with respect to the "T". Proper selection of the backup orifice sizes for each letter with respect to the others allows velocity control at the surface of the letter die such that each extrudate is travelling therethrough at the same linear velocity. Other variables of die construction and letter irregularities may also determine the proper backup orifice size. For example, the pin which forms the hole in the top of the "P" restricts open area and speeds velocity. Sharp corners on an "A" produce more frictional drag than the smooth curve of the letter "O" thus slowing velocity in the "A" relative to the "O". This multiplicity of interrelated variables makes the selection of proper size backup orifices both critical and a complicated process.

Although the invention has been described by a portrayal of a die plate fixedly mounted through intermediation of screws 36, it will be appreciated that the die plate really is a die zone having the aforesaid shape-defining dough passing and regulating characteristics and that the backup plate and spacer ring are the full equivalents of integral zones adapted to communicate cereal dough moieties of varying velocities to the cylindrical dough shaping chambers 26 a, b, c, d therein.

Although an assortment of four cereal dough shapes is shown, it will be understood that any number of combinations of shapes may be incorporated into such a die assembly within the spirit of the present invention.

What is claimed is:

1. An improved extrusion shaping apparatus for continuously producing an assortment of extrusion puffed dough shapes, all at substantially the same linear extrusion velocity, comprising:
   (a) a rotatable extrusion screw for feeding a gelatinized cereal mixture from a confined zone of high pressure to a die means for exit to an unconfined zone of lower pressure;
   (b) a die means having a plurality of restricted die orifices of varying cross-section and shape, for shaping the cereal mixture as it passes from the confined zone to the unconfined zone where it expands; and
   (c) modulating backup means, positioned between the extrusion screw and the die means and having a plurality of flow adjusting chambers, each of the chambers being in communication with one of the restricted orifices, and each of the flow adjusting chambers being of suitable size and configuration to modulate the flow of cereal mixture through its respective restricted die orifice, such that the dough is expressed from all of the restricted die orifices at substantially the same linear extrusion velocity.

2. Apparatus of claim 1 further comprising means, positioned between said extrusion screw and said modulating backup means, defining a buffering zone for modulating the flow of the cereal mixture to said modulating backup means.

3. The apparatus of claim 1 further comprising cutting means adapted to rotate about the face of said die means and repetitively intercept the extruded dough at a constant frequency to thereby produce cut, puffed dough shapes of substantially the same linear extent.

4. The apparatus of claim 1 wherein the plurality of extrusion orifices have differing cross-sectional areas.

5. The apparatus of claim 4 wherein the assortment of extrusion orifices have differing outlines.

* * * * *